(12) United States Patent
Eidt et al.

(10) Patent No.: US 8,235,444 B2
(45) Date of Patent: Aug. 7, 2012

(54) VEHICLE INTERIOR COVERING AND A METHOD FOR ITS MANUFACTURE

(75) Inventors: Ralf Eidt, Bingen-Gaulsheim (DE); Wolfgang Plegge, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/100,011

(22) Filed: May 3, 2011

(65) Prior Publication Data
US 2011/0278872 A1    Nov. 17, 2011

(30) Foreign Application Priority Data

May 11, 2010   (DE) .................... 20 2010 006 678 U

(51) Int. Cl.
*B60J 7/00* (2006.01)
(52) U.S. Cl. .................................... 296/39.1; 296/37.16
(58) Field of Classification Search ............... 296/37.16, 296/39.1, 24.44, 191, 214
See application file for complete search history.

(56) References Cited

U.S. PATENT DOCUMENTS

| | | | |
|---|---|---|---|
| 5,253,829 A | 10/1993 | Willey | |
| 5,694,718 A | 12/1997 | Norton | |
| 6,196,622 B1* | 3/2001 | Brodt et al. | 296/203.04 |
| 7,147,276 B2* | 12/2006 | Pfeffer et al. | 296/214 |
| 8,048,246 B2 | 11/2011 | Perez Madueno et al. | |
| 2003/0168878 A1 | 9/2003 | Myers | |
| 2004/0104600 A1* | 6/2004 | Kiesewetter et al. | 296/191 |
| 2005/0057058 A1 | 3/2005 | Willett | |
| 2008/0169678 A1* | 7/2008 | Ishida et al. | 296/191 |

FOREIGN PATENT DOCUMENTS

| | | |
|---|---|---|
| DE | 3304342 A1 | 8/1984 |
| DE | 8711513 U1 | 10/1987 |
| DE | 9302870 U1 | 5/1993 |
| DE | 4202391 A1 | 8/1993 |
| DE | 102004017023 A1 | 10/2005 |
| DE | 102005043517 A1 | 3/2007 |
| DE | 102006003942 A1 | 8/2007 |
| WO | 2006071518 A1 | 7/2006 |

OTHER PUBLICATIONS

German Patent Office, German Search Report for German Application No. 202010006678.6, dated Nov. 30, 2010.

* cited by examiner

*Primary Examiner* — Joseph Pape
(74) *Attorney, Agent, or Firm* — Ingrassia Fisher & Lorenz, P.C.

(57) ABSTRACT

A vehicle interior is provided for covering with an edge cladding and method is provided for manufacturing a vehicle covering. The vehicle interior includes, but is not limited to a decorative material, a plush material, and a flat profiled core material with a visible side and hidden rear side. The visible side is coherently connected with the decorative material and the rear side is coherently connected with the plush material that is formed at least partially from a thermoplastic. The vehicle interior also includes, but is not limited to an interior covering, a U-shaped edge cladding formed at least partially of a thermoplastic material and bordering one edge of the interior covering such that a first leg of the U-shaped edge cladding covers a material of the visible side and a second leg covers the plush material of the rear side, a substantially continuous bead of adhesive bonding the U-shaped edge cladding with an edge and running in the U-profile, and a plurality of point welds connecting thermoplastic material of the second leg with thermoplastic material of the plush material.

20 Claims, 3 Drawing Sheets

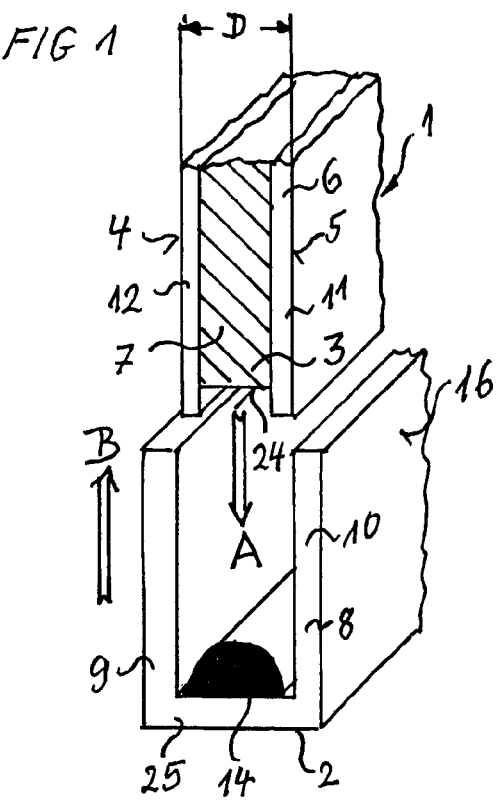
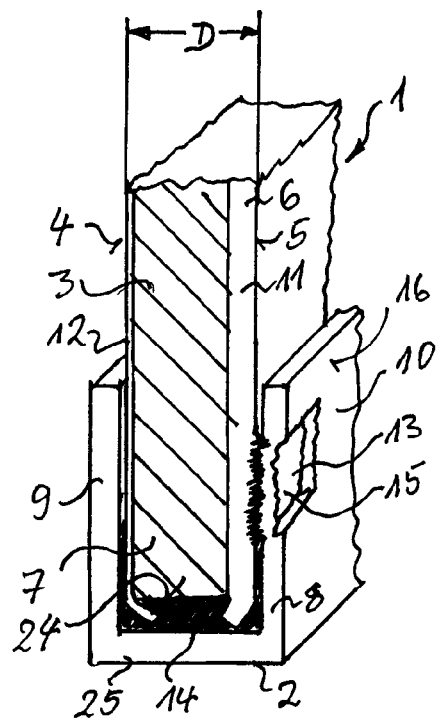
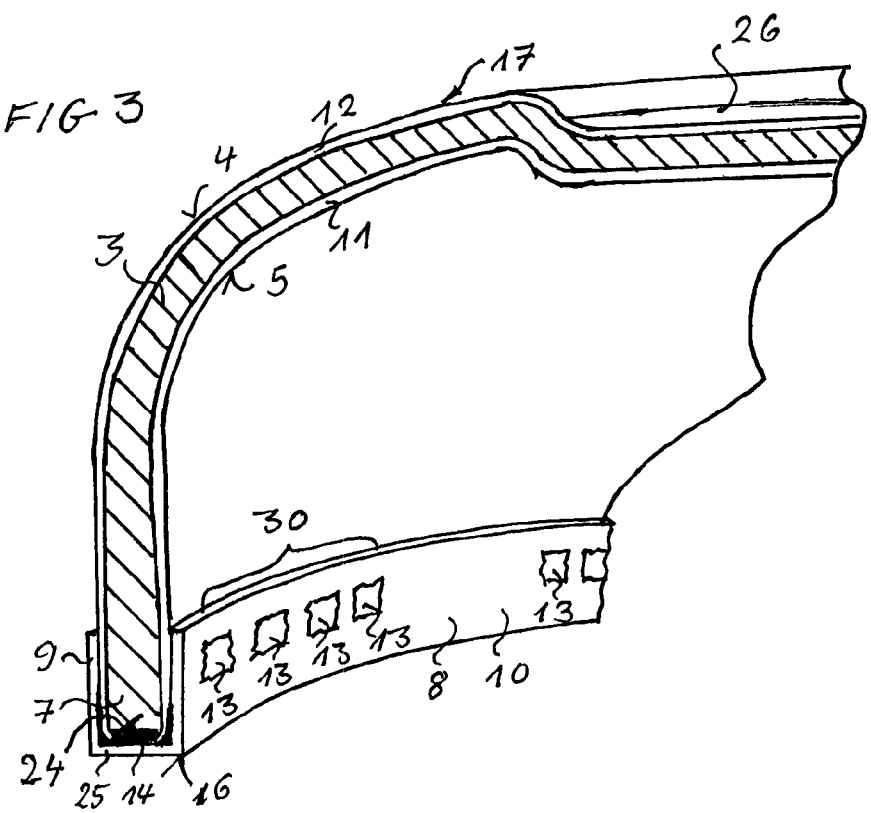

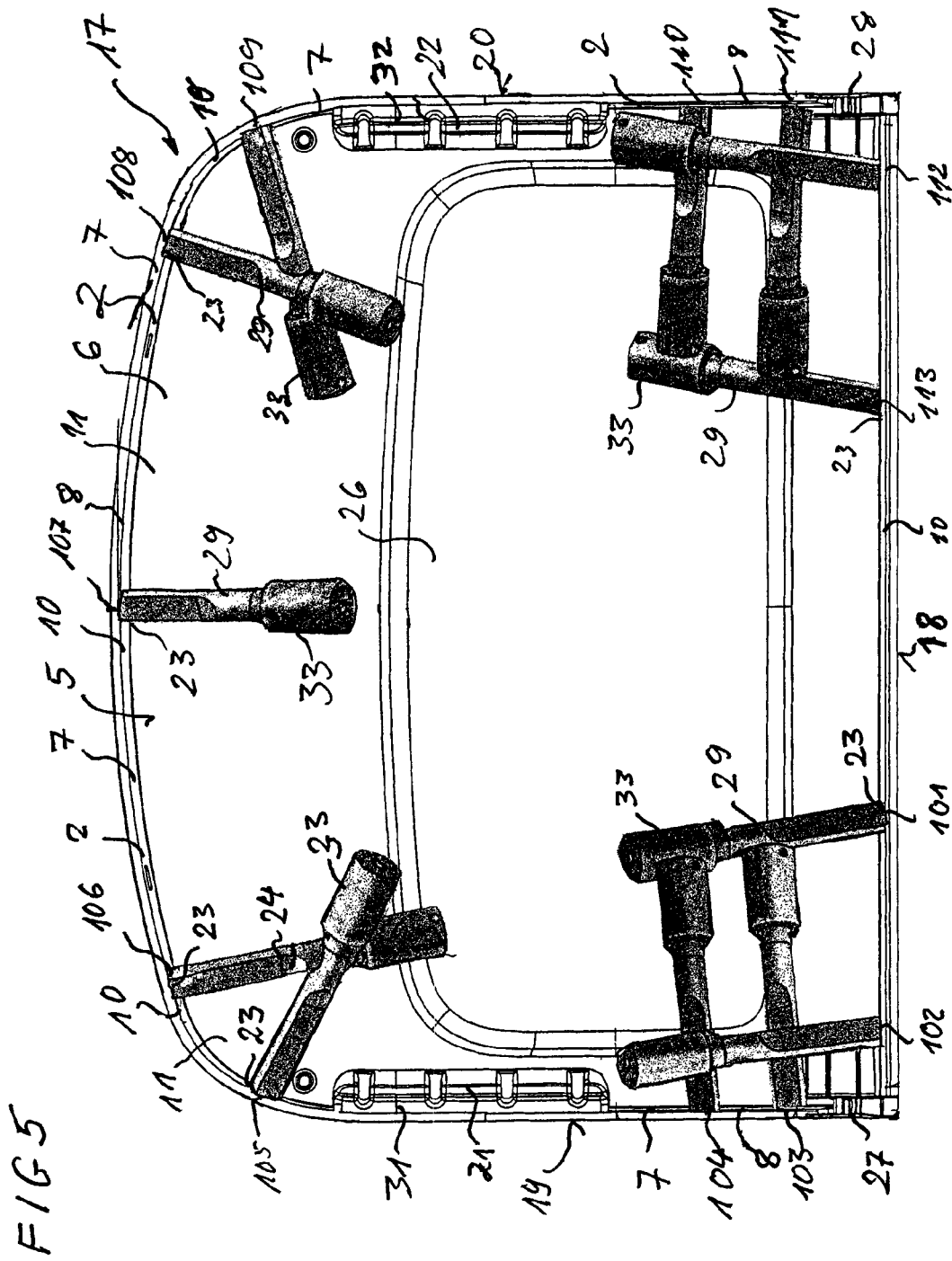

VEHICLE INTERIOR COVERING AND A METHOD FOR ITS MANUFACTURE

CROSS-REFERENCE TO RELATED APPLICATION

This application claims priority to German Patent Application No. 202010006678.6, filed May 11, 2010, which is incorporated herein by reference in its entirety.

TECHNICAL FIELD

The technical field relates to a vehicle interior covering and a method for its manufacture. The vehicle interior covering is self-supporting, and has a flat profiled core material with a visible side and hidden rear side. The visible side is coherently connected with a decorative material, and the rear side is coherently connected with a plush material or fleece consisting of thermoplastic. One edge of the vehicle interior covering is bordered by a U-shaped edge cladding, a so-called weather strip with a thermoplastic material.

BACKGROUND

Described for this purpose in publication DE 10 2005 043 517 A1 is a joining of cover means with a component whose one free end adjacent to a bend and fold line has a bending bracket folded around the bend and fold line. The bending bracket is bonded to the cover means with a first adhesive, and to the component with a second adhesive. The first adhesive is here in contact with the second adhesive. The publication further discloses that the bonding of cover means involves in particular the adhesive bonding of a textile convertible top with a rear window of a motor vehicle. Additionally known from the publication is that the second adhesive can be at lest partially activated by ultrasound, during which it is liquefied.

One disadvantage to this bonding of cover means is that the cover means itself must be folded over in the shape of a U even in its edge region for this bond. As a result, this bonding is not suitable for cladding an edge of a self-supporting vehicle interior covering, especially since those vehicle interior coverings have a flat profiled core material that cannot be folded over at the edge like a textile convertible top of a motor vehicle.

In view of the foregoing, at least one object is to indicate a vehicle interior covering with an edge structure and a method for its manufacture, wherein the edge structure is reliably and securely fixed to an edge of the vehicle interior covering. In addition, other objects, desirable features and characteristics will become apparent from the subsequent summary and detailed description, and the appended claims, taken in conjunction with the accompanying drawings and this background.

SUMMARY

One embodiment provides a vehicle interior covering and a method for its manufacture. The vehicle interior covering is self-supporting, and has a flat profiled core material with a visible side and a hidden rear side. The visible side is coherently connected with a decorative material, and the rear side is coherently connected with a plush material or fleece consisting of thermoplastic. One edge of the vehicle interior covering is bordered by a U-shaped edge cladding, a so-called weather strip consisting of a thermoplastic material, in such a way that a first leg of the U-shaped edge cladding covers the material of the visible side, and a second leg covers the fleece of the rear side. The U-shaped edge cladding is bonded with the edge by an adhesive bead running in the U-profile, and the thermoplastic material of the second leg is point welded with the thermoplastic material of the fleece.

The advantage to this vehicle covering is that both the decorative material on the visible side and the fleece on the rear side of a flat profiled core material are provided by the U-shaped edge cladding with an attractive, non-ragged, and uniformly structured edge area. In addition, the advantage to this vehicle interior covering is that it is self-supporting, and the edge area can be used anywhere inside the vehicle for a wide variety of coverings for hollow spaces. The advantage to this vehicle interior covering becomes particularly evident when using it to realize a rear shelf in the tail of the vehicle.

Such a rear shelf have a bent edge region, wherein the edge of a front corner can be provided with hinged joints in order to flip the rear shelf up and down. Further, the edge region additionally reinforced, protected and supported by the edge cladding can be placed on lateral edge holders or lateral edge compartments of the rear section of the vehicle, without the edges becoming further ragged or damaged. As a result, the advantage to the edge cladding is that it reinforces the core material of the vehicle interior covering, and protects the coatings on the front and rear side against damage caused by wear.

In addition, the dual fixation achieved by bonding the edge of the vehicle interior covering with the U-shaped edge cladding using a bead of adhesive on the one hand, and by point welding the thermoplastics of a non-visible leg of the U-shaped edge cladding to the thermoplastic material on the rear side of the core material, offers the advantage of virtually preventing an unintended separation of the edge cladding from the edge of the vehicle interior covering. Point welding fixes the edge cladding on the edge of the vehicle interior covering in such a way that the edge cladding can only be separated from the edge of the vehicle interior covering by destroying the edge cladding in the point-welded area.

The bead of adhesive introduced in the U-shaped edge cladding initiates and supports adhesion of the edge cladding on the edge of the vehicle interior covering between the point welds. To this end, point welds spaced 30 cm apart from each other are arranged on the second leg of the edge cladding.

A one-component adhesive based on butyl is provided as the bead of adhesive. The method for thermoplastically welding the second leg of the U-shaped edge covering with the fleece of the vehicle interior covering is preferably performed with an ultrasound welding device, in which ultrasound welding points are created through ultrasound excitation and movements of the thermoplastics to be welded relative to each other. The ultrasound welding only melts the materials to be welded in a micrometer range, so that the ultrasound welding process is gentle on the materials in use, and brings about a kind of friction weld between the thermoplastics to be welded.

The self-supporting core material forming the edge of the vehicle covering can have a flat profiled compression molding material. Such a compression molding material is preferably made of a cellulose fiber compression molding material, or some other compressed, fiber-reinforced natural material based on hemp, jute, reeds or straw. In another embodiment of the application, the thermoplastic in the fleece consists of a polymeric material based on polypropylene, polyethylene or polyester. The U-shaped edge cladding has an extrusion molded or extruded profile, and can also consist of such a thermoplastic based on polypropylene, polyethylene or a polyester.

Such vehicle interior coverings take the form of a rear shelf in another embodiment of the application, wherein the rear shelf has a downwardly bent edge region, and the rear shelf is arranged so that it can pivot around a front edge corner in the tail section inside the vehicle. The U-shaped, continuous edge cladding of the rear shelf is supported by lateral edge holders in the tail section at the lateral corners. In addition to a purely optical function, the U-shaped edge cladding first and foremost also acts to support and protect the edge of such a vehicle interior covering.

One method for manufacturing a vehicle interior covering involves the following procedural steps. A precisely fitting, self-supporting vehicle covering is first manufactured from a flat, profiled core material with a visible side and hidden rear side. A U-shaped edge cladding consisting of a thermoplastic material with an incorporated, continuous bead of adhesive is applied to the edge of this self-supporting vehicle interior covering in such a way that a first leg of the U-shaped edge cladding covers a decorative material of the visible side, and a second leg covers a fleece made of thermoplastic material on the rear side. This is followed by a point welding of the second leg of the U-shaped edge cladding with the fleece of the rear side of the vehicle interior covering.

The advantage to this method is that the adhesive properties of the bead of adhesive can initially be used for performing the welding process in order to keep the U-shaped edge cladding in position continuously on the edge of the vehicle covering and achieve a preliminary fixation. The subsequent point welding of the non-visible, hidden second leg of the edge cladding to the rear side of the vehicle interior covering makes the edge cladding non-detachable, fixing it coherently on the edge of the vehicle interior cladding. As a result, the edge cladding can only be separated from the vehicle interior covering again by destroying the edge cladding itself. Consequently, the point welding process yields a reliable and durable fixation of the edge cladding on the vehicle interior covering.

An ultrasound weld at the welding points can be achieved with an ultrasound welding stamp, which is pressed onto the second leg, wherein the ultrasound stimulates a frictional weld of the thermoplastic materials of the edge cladding and the fleece. A plurality of ultrasound welding stamps can be simultaneously pressed onto the second leg of the U-shaped edge cladding if the vehicle interior covering is arranged in a corresponding retaining mold. Simultaneous point welding makes it possible to achieve a fixation for the entire continuous U-shaped edge cladding within a handful of seconds, which facilitates mass production. In addition, a single ultrasound welding stamp can have several adjacent weld points, for example four weld points, which provide for a multifold grip in a single weld position.

The method is preferably used for an edge cover of a rear shelf in the tail section of a vehicle, wherein the point welds are introduced at approximately 10 to 15 positions spaced apart from each other by means of ultrasound welding stamps. These approximately 10 to 15 welding positions can here advantageously be simultaneously welded via welding stamps, enabling a very high production rate for rear shelves.

BRIEF DESCRIPTION OF THE DRAWINGS

The present invention will hereinafter be described in conjunction with the following drawing figures, wherein like numerals denote like elements, and:

FIG. 1 shows a diagrammatic, partially perspective cross section through an edge cladding and an edge of a vehicle interior covering;

FIG. 2 shows a diagrammatic, partially perspective cross section through an edge of a vehicle interior covering with fixed edge covering;

FIG. 3 shows a diagrammatic, perspective view of a partially cut open rear shelf for a tail section of a vehicle;

FIG. 5 shows a diagrammatic view of the rear shelf according to FIG. 4 with an arrangement of 14 ultrasound welding stamps for permanently fixing an edge cladding on the edge of the rear shelf.

DETAILED DESCRIPTION

Figure 4:
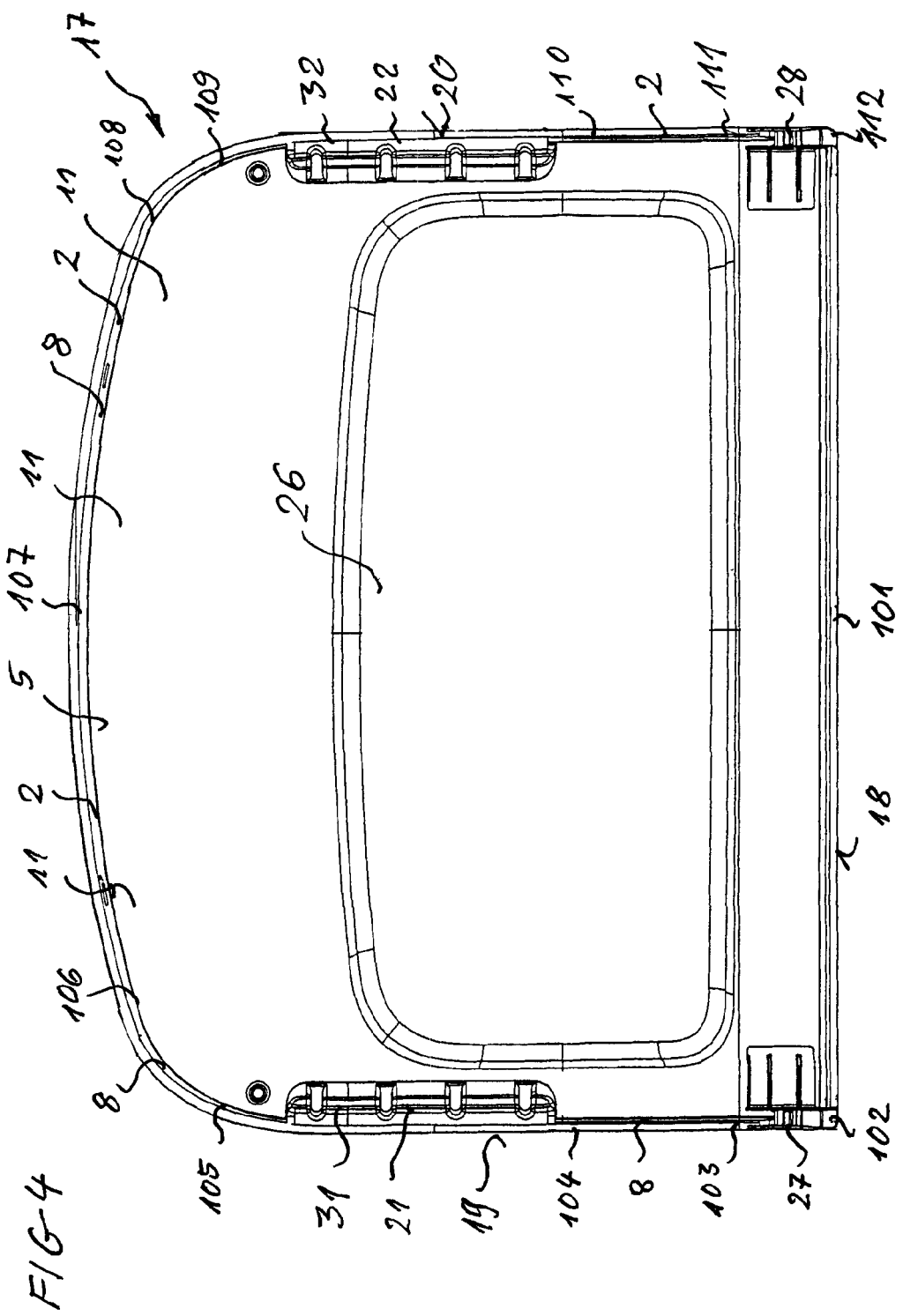
FIG. 4 shows a top view of the back side of a rear shelf arranged in a vehicle.

The following detailed description is merely exemplary in nature and is not intended to limit application and uses. Furthermore, there is no intention to be bound by any theory presented in the preceding background or summary or the following detailed description.

FIG. 1 shows a diagrammatic cross section through an edge cladding 2 and an edge 7 of a vehicle interior covering 1 prior to arranging the edge cladding 2 onto the edge 7 of the vehicle interior covering 1. The edge cladding 2 has a U-shaped, extruded profile 16 consisting of a thermoplastic polymeric material. The profile 16 has a first leg 9, a base 25 and a second leg 10. The thermoplastic material is about 1 mm thick, and the leg is about 8 mm long, with a base of approximately 6 mm, but the profile 16 of the extrusion molded, extruded thermoplastic material 8 of the edge cladding 2 can be adjusted to varying thicknesses D of the edge 7 of the vehicle interior covering 1.

The vehicle interior covering 1 has a self-supporting, profiled core material 3, the visible side 4 of which is coherently connected with a decorative material 12, and the rear side 5 of which is provided with a fleece 11 consisting of a thermoplastic 6. The edge 7 can have a ragged edge region on both the visible side with the decorative material 12 and the rear side with the fleece 11. In addition, the edge corner 24 of the core material 3 is susceptible to rubbing, grinding and scraping motions between the vehicle frame and vehicle interior covering, so that the edge cladding 2 not only has a decorative function, but also acts to protect the vehicle interior covering 1, so that it can be exposed to higher loads.

A bead of adhesive 14 is continuously and uninterruptedly situated within the U-shaped profile 16 on the base 25 of the U-profile 16. To achieve a preliminary adhesive bond between the edge cladding 2 and the edge 7 of the vehicle interior covering 1, the vehicle interior covering 1 can be moved in the direction of arrow A toward the bead of adhesive 14, or the U-shaped profile 16 can be upwardly shifted in the direction of arrow B toward the edge corner 24 of the edge 7 of the vehicle interior covering 1. The adhesive forces of such a bead of adhesive 14, for example one based on butyl, are unable to withstand all loads on such a vehicle interior covering 1, however. The ensuing figure shows a permanent fixation of the edge cladding 2 on the edge 7 of the vehicle interior covering 1.

FIG. 2 shows a cross section through an edge 7 of a vehicle interior covering 1 with a self-supporting core material 3 of a visible side 4 and a rear side 5. The visible side 4 is provided with a decorative material 12, and connected with the first leg 9 via the adhesive of the bead of adhesive 14 shown on FIG. 1, and adhesively connected in the base region 25 of the U-profile 16. The second leg 10 covers the fleece 11 on the rear side 5 of the vehicle interior covering 1, at least in the edge region 7, and is coherently connected with the leg 10 via a point weld 13. Since both the fleece 11 and the second leg 10 consist of thermoplastic, an ultrasound welding stamp can be applied to the point weld 13 and form an ultrasound weld point 15 in which the thermoplastics melt into each other in a micrometer range.

FIG. 3 shows a diagrammatic, perspective view of a partially cut open rear shelf 17, which is downwardly bent toward an edge 7 with its core material 3 of the visible side 4 and the rear side 5. Situated on the lower edge 7 is an edge cladding 2 made out of the U-shaped thermoplastic 8, which is adhesively connected not just by a bead of adhesive, but also permanently fixed by means of point ultrasound welds 13 introduced with an ultrasound welding stamp, wherein a welding stamp in the embodiment depicted creates four point ultrasound welds 13 in a single welding position 30.

FIG. 4 shows a top view of the rear side 5 of a rear shelf 17 arranged in a vehicle. The rear shelf 17 has a flat, profiled, self-supporting core material 3, which has a flat trough 26 for the rear shelf, and can be pivoted at a front edge corner 18 via hinged joints 27 and 28. Arranged on the vehicle body at the lateral corners 19 and 20 are retainers 31 and 32 with supporting surfaces 21 and 22, which keep the rear shelf 17 in a cover position. Weld points that fix the edge cladding 2 onto the edge 7 of the rear shelf are arranged with the 12 welding positions 101 to 112 distributed around the periphery of the rear shelf 17.

FIG. 5 shows the diagrammatic view of the rear shelf 17 according to FIG. 4 with an arrangement of 13 ultrasound welding stamps 23 in the welding positions 101 to 113. Each ultrasound stamp 23 is connected with an ultrasound sensor 33 by means of an ultrasound transmission tube 29. The welding positions 101 to 113 are here arranged in such a way that a total of 13 ultrasound sensors 33 with ultrasound tubes 29 and stamps 23 point weld the edge cladding 2 with the edge 7 of the rear shelf 17 on the rear side 5 of the latter in a single ultrasound welding step.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle interior covering with an edge cladding, comprising:
    an interior covering, comprising:
        a decorative material;
        a plush material;
        a core material with a first side and a rear side, the first side being coherently connected with the decorative material, and the rear side being coherently connected with the plush material that is formed at least partially from a thermoplastic material;
    a U-shaped edge cladding formed at least partially of a thermoplastic material and bordering one edge of the interior covering such that a first leg of the U-shaped edge cladding covers the decorative material of the first side and a second leg that covers the plush material of the rear side; and
    a substantially continuous bead of adhesive bonding the U-shaped edge cladding with the one edge of the interior covering, and
    a plurality of point welds between the thermoplastic material of the second leg and the thermoplastic material of the plush material.

2. The vehicle interior covering according to claim 1, further comprising the substantially continuous bead of adhesive for supporting adhesion of the U-shaped edge cladding and the one edge of the interior covering between the plurality of point welds.

3. The vehicle interior covering according to claim 2, wherein the substantially continuous bead of adhesive comprises a one-component adhesive based on butyl.

4. The vehicle interior covering according to claim 2, wherein the plurality of point welds are a plurality of ultrasound weld points.

5. The vehicle interior covering according to claim 1, wherein the core material is at least partially formed of a self-supporting compression molding material.

6. The vehicle interior covering according to claim 1, wherein the core material is at least partially formed of a cellulose fiber compression molding material.

7. The vehicle interior covering according to claim 1, wherein the core material has a compressed, fiber-reinforced natural material comprised of hemp.

8. The vehicle interior covering according to claim 1, wherein the core material has a compressed, fiber-reinforced natural material comprised of jute.

9. The vehicle interior covering according to claim 1, wherein the core material has a compressed, fiber-reinforced natural material comprised of reeds.

10. The vehicle interior covering according to claim 1, wherein the core material has a compressed, fiber-reinforced natural material comprised of straw.

11. The vehicle interior covering according to claim 1, wherein the plush material is a fleece formed at least partially of a thermoplastic having a polymeric material.

12. The vehicle interior covering according to claim 1, wherein the U-shaped edge cladding has a profile formed at least partially of a thermoplastic.

13. A method for manufacturing a vehicle covering, comprising:
    forming a self-supporting vehicle covering from a core material by:
        applying a decorative material to a first side of the core material; and
        applying a fleece material that is at least partially formed of thermoplastic material to a rear side of the core material;
    applying a substantially continuous bead of adhesive within a U-shaped edge cladding at least partially formed of a thermoplastic material;
    applying the adhesive within the U-shaped edge cladding to an edge of the self-supporting vehicle covering such that a first leg of the U-shaped edge cladding substantially covers the decorative material of the first side, and a second leg that covers the fleece material on the rear side; and
    point welding of the second leg with the fleece material of the rear side.

14. The method according to claim 13, further comprising:
    pressing ultrasound welding stamps against the second leg for stimulating a frictional weld of the thermoplastic material of the second leg of the U-shaped edge cladding and the fleece material.

15. The method according to claim 13, further comprising: pressing a plurality of ultrasound welding stamps in a substantially simultaneous manner onto the second leg of the U-shaped edge cladding to provide the point welding of the U-shaped edge cladding and the fleece material.

16. The method according to claim 13, further comprising generating a plurality of weld points that are adjacent with a single ultrasound welding stamp.

17. The method according to claim 13, introducing point welding with ultrasound welding stamps at approximately 10 to 15 spaced apart positions along the second leg of the U-shaped edge cladding.

18. The method according to claim 13, wherein the substantially continuous bead of adhesive is configured to support adhesion between the U-shaped edge cladding and the edge of the self-supporting vehicle covering between a plurality of point welds.

19. The method according to claim 18, wherein the substantially continuous bead of adhesive comprises a one-component adhesive based on butyl.

20. The method according to claim 18, further comprising at least partially forming the core material from a self-supporting compression molding material.

\* \* \* \* \*